Sept. 17, 1963 D. E. HARRIS 3,104,174

FRICTION FACING AND PROCESS OF MANUFACTURE

Filed May 9, 1960

INVENTOR.
DONALD E. HARRIS
BY
HIS ATTORNEY 3,104,174
FRICTION FACING AND PROCESS OF
MANUFACTURE
Donald E. Harris, Xenia, Ohio, assignor to General
Motors Corporation, Detroit, Mich., a corporation of
Delaware
Filed May 9, 1960, Ser. No. 27,520
4 Claims. (Cl. 117—4)

This invention relates to friction facings and is particularly concerned with friction facings for use in wet clutches and the like.

An object of the invention is to produce a friction facing for a wet clutch made from fibrous materials such as vegetable and/or mineral fibers in sheet-like form wherein the porosity of the fibers is maintained after impregnation thereof with a resin.

In carrying out the above object, it is a further object to utilize matted or sheeted paper-like material made from fibrous material and to impregnate said sheet with a waxy material, preferably in an emulsion form, to coat the porous fibers of the paper with said material and to thereafter coextensively impregnate the paper with a resinous material for bonding adjacent fibers together and to form a strong sheet-like element. This element has a degree of porosity between the fibers thereof and, when used in a wet clutch, the fibers themselves are porous or wick-like to permit flow of the fluid vehicle through the fibers.

In this connection, the waxy emulsion, upon drying out of the carrier, will leave the fibers in a highly porous condition although, during the resin impregnation step, the fibers are coated with the emulsion to prevent substantial ingress of the resin into the interstices within the individual fibers.

A still further object of the invention is to provide a sheet-like friction facing for a wet clutch and the like wherein paper formed from matted fibers or vegetable material, such as cellulose, cotton, asbestos and the like, alone or in combination, is treated with a waxy emulsion for filling the interstices within the individual fibers of the paper and wherein this treated paper is then impregnated with a resin such as a phenol formaldehyde resin which is cured to permanently bond the fibers together at their contacting portions whereby the sheet has a degree of porosity between fibers and likewise has a degree of porosity within the fibers which are now sheathed in the resin and wherein the waxy coating thereon prevented ingress of the resin into the fibers per se, the waxy emulsion being dispersed to produce a degree of porosity in the fibers.

Figure 1:
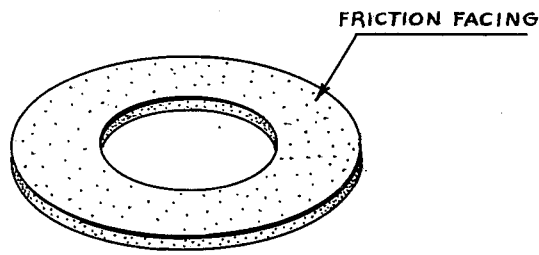
Figure 2:
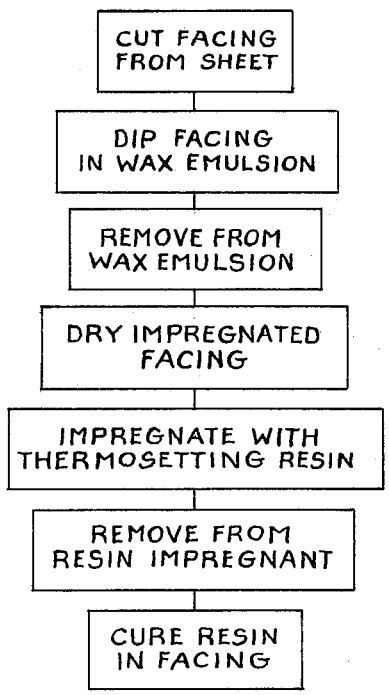

Further objects and advantages of the present invention will be apparent from the following description, reference being had to the accompanying drawings wherein FIG. 1 shows a perspective view of a typical friction facing and FIG. 2 is a flow chart showing the steps of the method of making such a facing.

Clutch plates used in automatic transmissions and the like are generally steel plates faced on one or both sides with friction facings and assembled into a pack which operates in a fluid vehicle such as a transmission oil. This fluid vehicle reduces the operating temperatures and improves the over-all operation of the transmission by cushioning the engagement of the several plates.

One such automatic transmission is described and claimed in Thompson Patent 2,357,295.

The friction facings used in a clutch pack of the character described may be produced by several means. Some of these facings may be porous metal and some may be combination facings of cork and paper-like material or the facings may be entirely paper-like material. The present invention is directed, in its entirety, to the paper-like friction facings which are formed from paper produced by conventional paper-making techniques such as the Fourdrinier screen process wherein pulp, which may be cellulose fibers, linen fibers, cotton linters, asbestos fibers, etc., are mixed and suspended in a fluid vehicle and are then deposited upon a screen in a mat which, due to the intermingling of the fibers, is more or less self-supporting. This mat, in most instances, is subsequently rolled or may be subsequently rolled to improve the strength and predetermine the thickness and density of the sheet.

The sheet so formed, after drying, is punched out into cookies or annuli which are attached to metal supporting discs wherein the vehicle for attaching is generally a resin such as a phenol formaldehyde resin or a combination of phenol formaldehyde and butadiene acrylonitrile resins, etc. Other uncured thermosetting resins may be used for this purpose and are chosen in accordance with their resistance towards heat. In any event, the cookies or annuli, after they are impregnated with the resin may be attached to the steel supporting discs and the resin is then cured to form a strong friction facing coextensively cemented to the steel support wherein the fibers of the resin produce a porous mat wherein adjacent fibers are bonded together at their contacting portions by the resin. It is apparent that, since the fibers are of a more or less porous nature, they absorb the resin so that the major porosity in the facing is limited to the porosity between adjacent fibers. In some instances, it may be desirable to cement the facing onto the support and then impregnate the facing with the resin or vice versa, either means being fully within the scope of the present invention. Clutch plates of this character are fully disclosed in Almen and Carnegie Patent 2,733,797.

One of the drawbacks of facings of this character is the relatively low degree of porosity or microporosity which, when the paper is made sufficiently strong, that is, sufficiently dense, reduces the porosity of the impregnated paper. This reduced porosity is demonstrated by lower coefficients of friction and increased operating temperatures over the clutch plates made under the teachings of this invention which will be described hereinafter. These conditions accrue due to the fact that the fluid vehicle, namely, the transmission oil between the plates, upon engagement thereof, is not dissipated sufficiently fast to permit intimate face-to-face contact of the plates coextensively which causes a small degree of slip therebetween creating lower torque and high temperature conditions.

The present invention overcomes these past difficulties in friction facings of the so-called paper type and these improved operating characteristics are obtained by treating the paper prior to impregnation thereof with the resin. The specific treatment used by me involves dipping the paper in a wax emulsion wherein such waxes as carnauba wax, beeswax and microcrystalline waxes of the hydrocarbon series may be used in finely divided form, for example, in sizes of from .5 to 15 microns average particle size. Any wax having a melting point above 120° F. may be used although waxes having melting points above 150° F. are preferred. These waxes may be emulsified in a water solution by means of any well known emulsifying agent to produce a wax emulsion of the variety commonly known as floor wax. The wax emulsion may be formed by using an amine type soap as formed by the reaction of triethanolamine and a fatty acid such as stearic or oleic acid. The soap is added to the melted wax together with hot water to give the mixture the desired viscosity and wax content. Wax emulsions including about 40% by weight of wax are generally preferred.

The properties of the wax with respect to the friction facing may be enhanced by the addition of tack-producing agents such as rosin in the emulsion in quantities of from one-third to equal parts of the wax used. After the paper is impregnated with the wax emulsion, it is air and oven dried at temperatures above 212° F., preferably at about 215° F. This causes the elimination of the fluid vehicle in the emulsion and causes the wax, which is carried thereby, to melt and coat the fibers internally and externally to form a relatively thin protective coating all over the external and internal parts of the fiber. This wax impregnated cookie is then treated with the thermosetting resin as above described either by impregnation and attachment to the supporting surface or by cementing to the supporting surface and impregnating thereafter wherein the resin impregnant coats the external surfaces of the fibers and bonds adjacent fibers together at their contacting surfaces but, due to the presence of the wax, does not enter into the fibers, leaving them in a resin-starved or wick-like condition. A suitable phenolic impregnant may be made as follows:

|  | Parts |
|---|---|
| Phenol crystals | 47 |
| Formaldehyde sol., 35 to 40 pct. tec | 51.5 |
| Ammonium hydroxide, 28 pct. sol | 1.5 |

The impregnation of the paper discs may be accomplished by mixing equal parts of the above formula with isopropyl alcohol to yield a solution having about 20% to 25% solids content after evaporation. The impregnation of the paper rings is accomplished by placing the rings in this diluted solution for from 2 to 3 minutes, centrifugally spinning off excess resin and then drying in an oven at about 200° F. for about 30 minutes. The resin may be applied to the paper by any other known method which yields a uniform impregnation, for example, transfer rolling, brushing, controlled spraying, etc.

The impregnated cookie or disc is heated to cure the resin which, in the case of phenol formaldehyde resin, requires temperatures in the order of 300° F. to 375° F. During this cure, it is believed that there is a further dissipation of the wax leaving the fibers in a more absorbent condition. After the discs have been dried, they may be cemented to metal discs by means of a suitable adhesion cement. One of such cements can be made by utilizing the resin ingredient disclosed in the above formula and diluting same with propyl alcohol together with a small quantity of hexamethylene-tetramine. The cement may be reinforced with china clay, if desired. While this cement is entirely satisfactory, other phenol formaldehyde base cements which are commercially manufactured, for example, phenol formaldehyde-butadiene acrylonitrile copolymer cements, sold under the trade-name of "Cycleweld," are also useful.

The finished plate, when placed in a clutch pack, shows approximately 10% more torque carrying capacity within the pack than a similar pack using clutch plates wherein the paper was not previously wax treated and I believe that this improved result is brought about by the fact that the fibers in the paper are of a wick-like nature in the present instance permitting the fluid of the transmission or clutch pack to pass therethrough and thereby be eliminated from the mating surfaces more quickly, thus yielding higher torque and simultaneously reducing slip and limiting rising temperatures.

In my copending application with Harold W. Schultz, S.N. 27,492, filed concurrently herewith, additional details are set forth with respect to the preferred ingredients used in the paper although it should be understood that this invention is not limited by the paper used and is specifically directed to the emulsion treatment of any suitable paper prior to impregnation with any desired resin to improve the frictional qualities of the product over a similar product not so treated.

While the embodiments of the present invention as herein disclosed constitute preferred forms, it is to be understood that other forms might be adopted.

What is claimed is as follows:

1. A friction facing for a wet clutch and the like and adapted to be coextensively supported upon a strong backing plate of suitable design, said facing consisting of a porous, felted mat of fibrous material wherein each of the fibers includes a dual coating consisting of a wax sheath contiguous with the surface of each fiber and a coextensive outer layer of a bonding material consisting of a thermosetting resin, said wax being taken from the class consisting of waxes melting above 120° F. and being present in quantities of from about 1% to 6% by weight of the fibrous material in the mat, the coefficient of friction of said facing being in the order of 10% higher than a similar material without the wax.

2. The friction facing as claimed in claim 1 wherein the fibrous material comprises a major portion of cellulose fibers and a minor portion of asbestos fibers.

3. In a method for making a porous felted friction facing particularly adapted for use in wet clutches and the like, comprising the steps of, immersing a felted paper mat in a wax emulsion for impregnating the mat with the wax emulsion, removing excess wax emulsion from said mat so as to bring the quantity of wav to from 1% to 6% by weight of the fibrous material, drying the wax impregnated mat, then impregnating the dried wax impregnated mat with a fluid thermosetting resin and subsequently curing the thermosetting resin for hardening the mat.

4. In a method for making a porous friction facing particularly adapted for use in wet clutches and the like, the steps comprising, cutting facings from a sheet of felted paper, dipping said cut facings in a wax emulsion containing wax in the order of from 1% to 6% by weight of the paper, maintaining the paper in the wax emulsion for a time sufficient to cause complete impregnation thereof, removing the impregnated paper from the wax emulsion and drying the same for causing the wax to form a coextensive coating over the entire surface of the fibrous material, impregnating the dried facing with a liquid thermosetting resin material and subsequently curing the resin material for forming a wear-resistant facing having a high degree of porosity.

References Cited in the file of this patent

UNITED STATES PATENTS

| 1,493,290 | Stanley | May 6, 1924 |
| 1,785,969 | Norton | Dec. 23, 1930 |
| 1,887,981 | Rosher | Nov. 15, 1932 |
| 2,553,215 | Schultz | May 15, 1951 |
| 2,733,797 | Alman et al. | Feb. 7, 1956 |

FOREIGN PATENTS

| 471,098 | Canada | Jan. 23, 1951 |

OTHER REFERENCES

Casey, "Pulp and Paper," vol. 1 (1952). Interscience Publishers Inc., New York, pages 490–491, relied on.